(12) United States Patent
Lee, Jr. et al.

(10) Patent No.: US 9,462,816 B2
(45) Date of Patent: Oct. 11, 2016

(54) OYSTER OPENING DEVICE

(71) Applicants: Robert Lee, Jr., Macon, GA (US);
Gregory Parker, Macon, GA (US)

(72) Inventors: Robert Lee, Jr., Macon, GA (US);
Gregory Parker, Macon, GA (US)

( * ) Notice: Subject to any disclaimer, the term of this patent is extended or adjusted under 35 U.S.C. 154(b) by 0 days.

(21) Appl. No.: 14/941,132

(22) Filed: Nov. 13, 2015

(65) Prior Publication Data
US 2016/0066725 A1    Mar. 10, 2016

Related U.S. Application Data

(63) Continuation-in-part of application No. 14/705,454, filed on May 6, 2015, now abandoned.

(60) Provisional application No. 62/011,545, filed on Jun. 12, 2014.

(51) Int. Cl.
*A22C 29/00* (2006.01)
*A22C 29/04* (2006.01)
*A47G 21/06* (2006.01)

(52) U.S. Cl.
CPC ........... *A22C 29/046* (2013.01); *A47G 21/062* (2013.01)

(58) Field of Classification Search
CPC .... A22C 29/00; A22C 29/04; A22C 29/025; A22C 29/026; A22C 29/027; A22C 29/046
USPC ................. 452/1, 6, 12, 13, 15–17; 30/120.1–120.5, 184; 83/628–630, 83/632, 856, 870, 932
See application file for complete search history.

(56) References Cited

U.S. PATENT DOCUMENTS

| | | | | |
|---|---|---|---|---|
| 2,473,609 A * | 6/1949 | Plock | ......... | A47G 21/061 |
| | | | | 452/16 |
| 4,796,333 A * | 1/1989 | Stinson, Jr. | ......... | A47G 21/062 |
| | | | | 452/16 |
| 5,334,080 A * | 8/1994 | Webb | ......... | A47G 21/062 |
| | | | | 452/13 |
| 5,482,500 A * | 1/1996 | Boettner | ......... | A47G 21/062 |
| | | | | 452/13 |
| 6,244,948 B1 * | 6/2001 | LiRosi | ......... | A22C 29/046 |
| | | | | 452/16 |
| 7,582,005 B1 * | 9/2009 | Le | ......... | A22C 29/046 |
| | | | | 452/16 |
| 7,785,176 B1 * | 8/2010 | Le | ......... | A22C 29/046 |
| | | | | 452/16 |

* cited by examiner

*Primary Examiner* — Richard Price, Jr.
(74) *Attorney, Agent, or Firm* — Smith Tempel Blaha LLC; Matthew T. Hoots (57) ABSTRACT

Disclosed is an oyster shucking device, of which both manual and automated embodiments are envisioned. An exemplary embodiment is constructed of aluminum and/or stainless steel and may be mounted on a wooden, steel or plastic base. A double roller bearing arrangement housed in a bearing box above a spike and positioning cylinder generates an efficient transfer of an actuation force to an oyster hinge while providing a user with the ability to adjust the amount of force applied to the oyster. Additionally, the spike and positioning cylinder arrangement provides for consistent and stable alignment of the spike all the way through a stroke. Further, the vertical travel of the spike as guided by the positioning cylinder provides for a wide range of travel by the spike to accommodate various oyster sizes without having to reconfigure or adjust the setup of the device.

7 Claims, 8 Drawing Sheets

OYSTER OPENING DEVICE

CROSS REFERENCE TO RELATED APPLICATIONS

This application is a continuation-in-part of the U.S. non-provisional application entitled "OYSTER OPENING DEVICE," filed on May 6, 2015 and assigned application Ser. No. 14/705,454 and which claimed priority under 35 U.S.C. §119(e) to U.S. provisional application entitled "OYSTER OPENING DEVICE," filed on Jun. 12, 2014 and assigned application Ser. No. 62/011,545. The entire contents of both application Ser. Nos. 14/705,454 and 62/011,545 are hereby incorporated by reference.

BACKGROUND

The present invention relates to a mechanical device for opening oysters, i.e. a device for "shucking" oysters. Traditionally, oyster shucking is a manual endeavor requiring the use of a thin bladed device. The user holds an oyster in one hand and uses the blade with the other hand to pry open the oyster. Besides being inherently dangerous due to the risk of the blade slipping from the oyster and into the user's hand, the process is slow. Even the most experienced person at oyster shucking can only open so many oysters over a period of time. Safety considerations notwithstanding, commercial establishments that serve oysters are desirous of devices and/or methods for shucking oysters that increase the rate at which oysters may be opened. Simply put, the faster a person can pry open oysters, the more profitable the commercial establishment stands to be.

Therefore, what is needed in the art is an oyster opening device, i.e. an oyster shucking device, that is safe to use and provides for quick and efficient opening of oysters.

BRIEF SUMMARY OF THE INVENTION

Various embodiments, aspects and features of the present invention encompass an oyster shucking device, of which both manual and automated embodiments are envisioned. An exemplary embodiment is constructed of aluminum and/or stainless steel and may be mounted on a wooden, steel or plastic base. A double parabolic roller bearing arrangement housed in a bearing box above a spike and positioning cylinder generates an efficient transfer of an actuation force to an oyster hinge while providing a user with the ability to adjust the amount of force and length of stroke applied to the oyster. Additionally, the spike and positioning cylinder arrangement provides for consistent and stable alignment of the spike all the way through a stroke. Also, a travel stop feature, in conjunction with the spike and positioning cylinder arrangement, allows for use of the oyster shucking device without significant risk of injury to the user. Further, as will become apparent from the following description and attached drawings, the vertical travel of the spike as guided by the positioning cylinder provides for a wide range of travel by the spike to accommodate various oyster sizes without having to reconfigure or adjust the setup of the device.

Embodiments of an oyster shucking device according to the invention are not limited to the exemplary aspects and features described above and below. Certain embodiments may include additional features, or different features, while other embodiments include alternative features. As a way of example, and not limitation, it is envisioned that different embodiments of an oyster shucking device may be configured to include different curvatures to the actuation handle, different overall dimensions, different spike shapes, etc. Moreover, while some embodiments of an oyster shucking device according to the invention may be constructed via stainless steel, plastic and/or aluminum, embodiments are not limited by materials of construction as it is envisioned that an oyster shucking device may be constructed from any suitable material or combination of materials that may occur to one of ordinary skill.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DESCRIPTION

Figure 1:
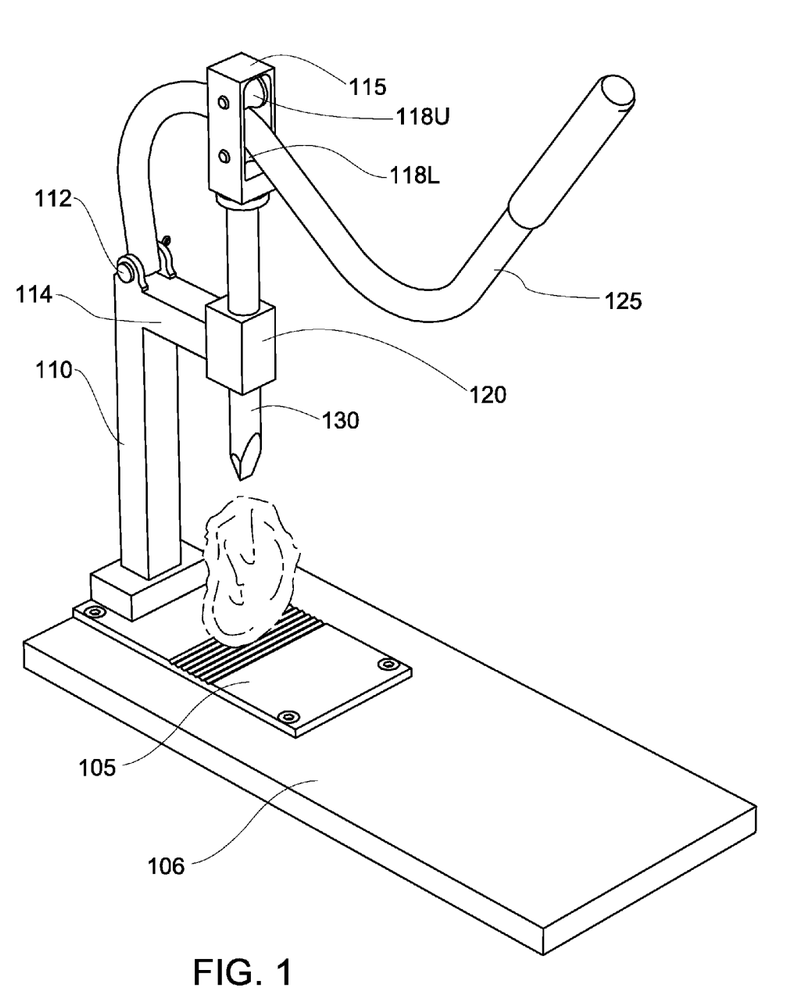
FIG. 1 is a perspective view of an oyster opening device according to an exemplary embodiment of the solution, shown in a retracted, pre-actuation "starting" position prior to applying an opening force to an oyster.
Figure 2:
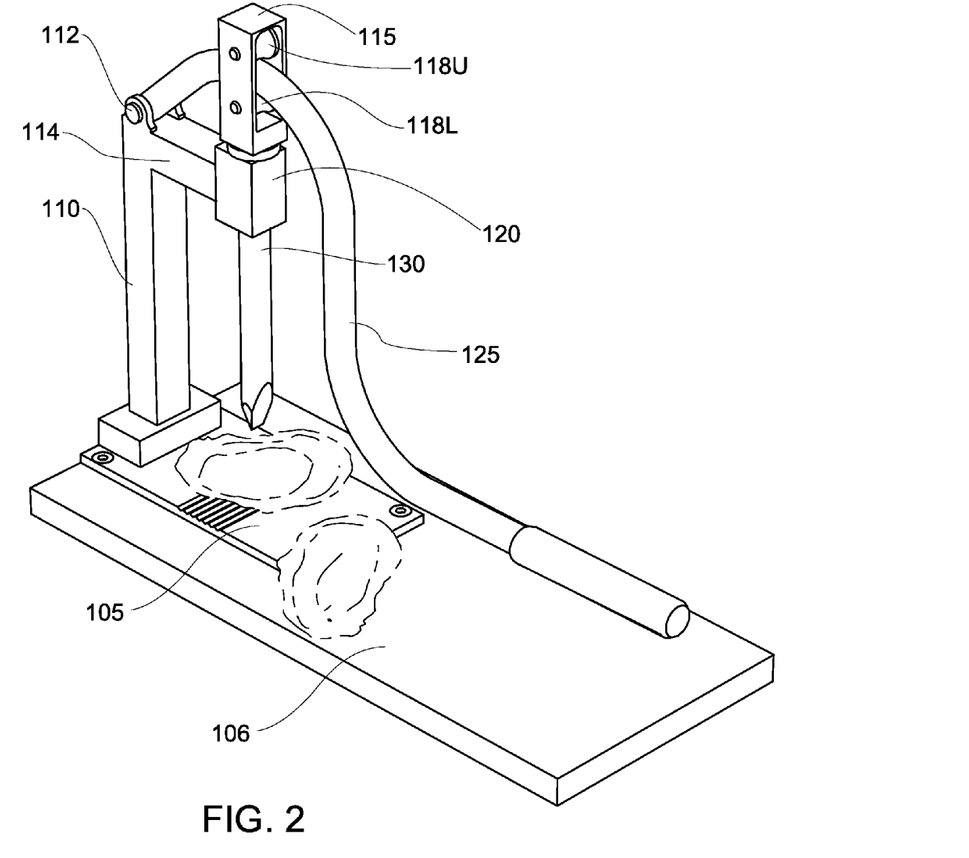
FIG. 2 is a perspective view of the exemplary embodiment of an oyster opening device depicted in FIG. 1, shown in an extended, post-actuation position after having been used to apply an opening force to an oyster.
Figure 3:
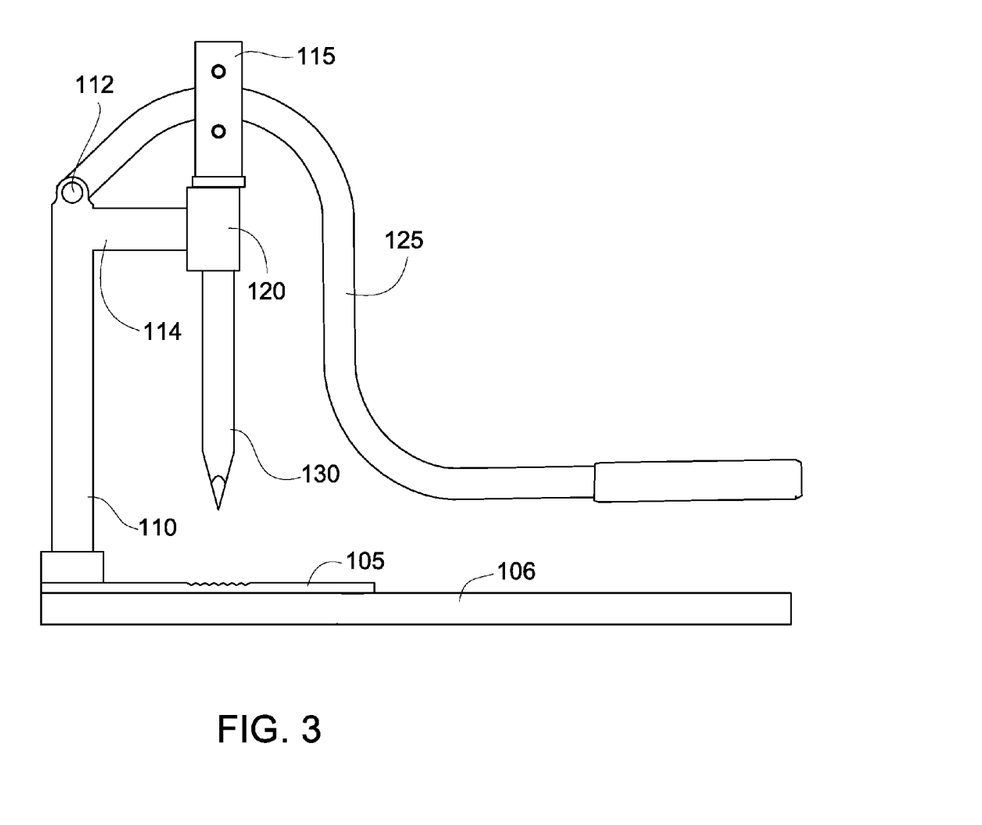
FIGS. 3-4 are left-side and right-side plan views, respectively, of the exemplary embodiment of an oyster opening device depicted in FIG. 2.
Figure 4:
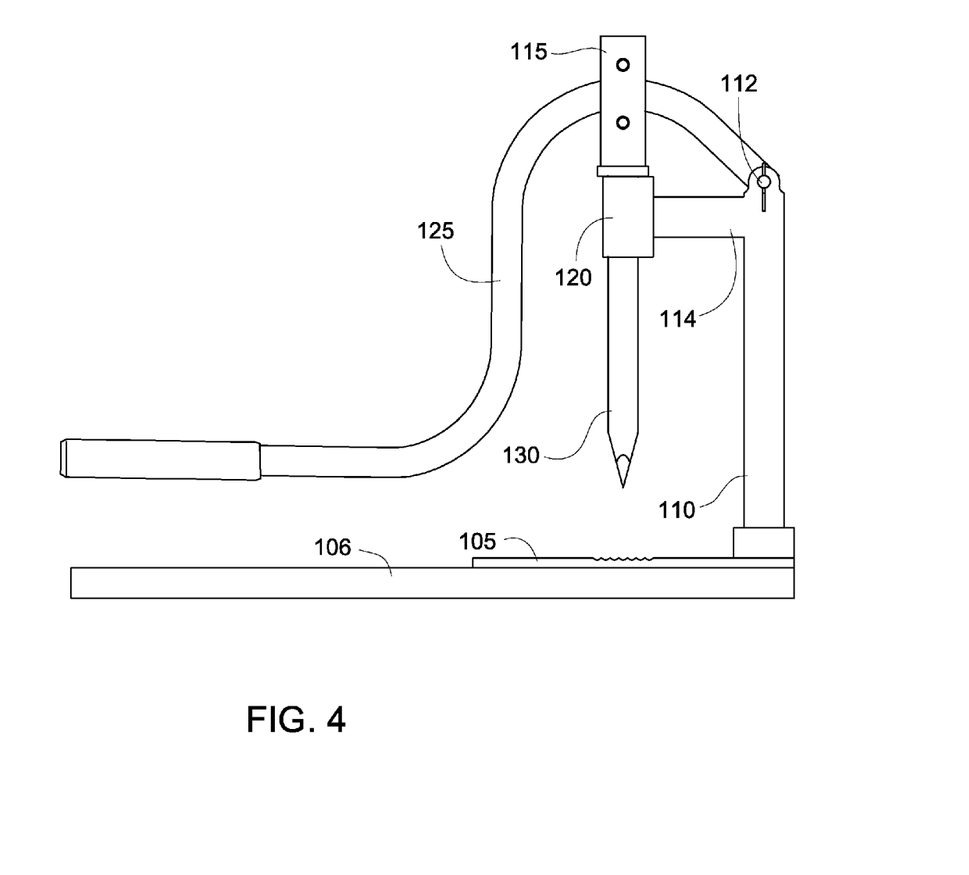
Figure 5:
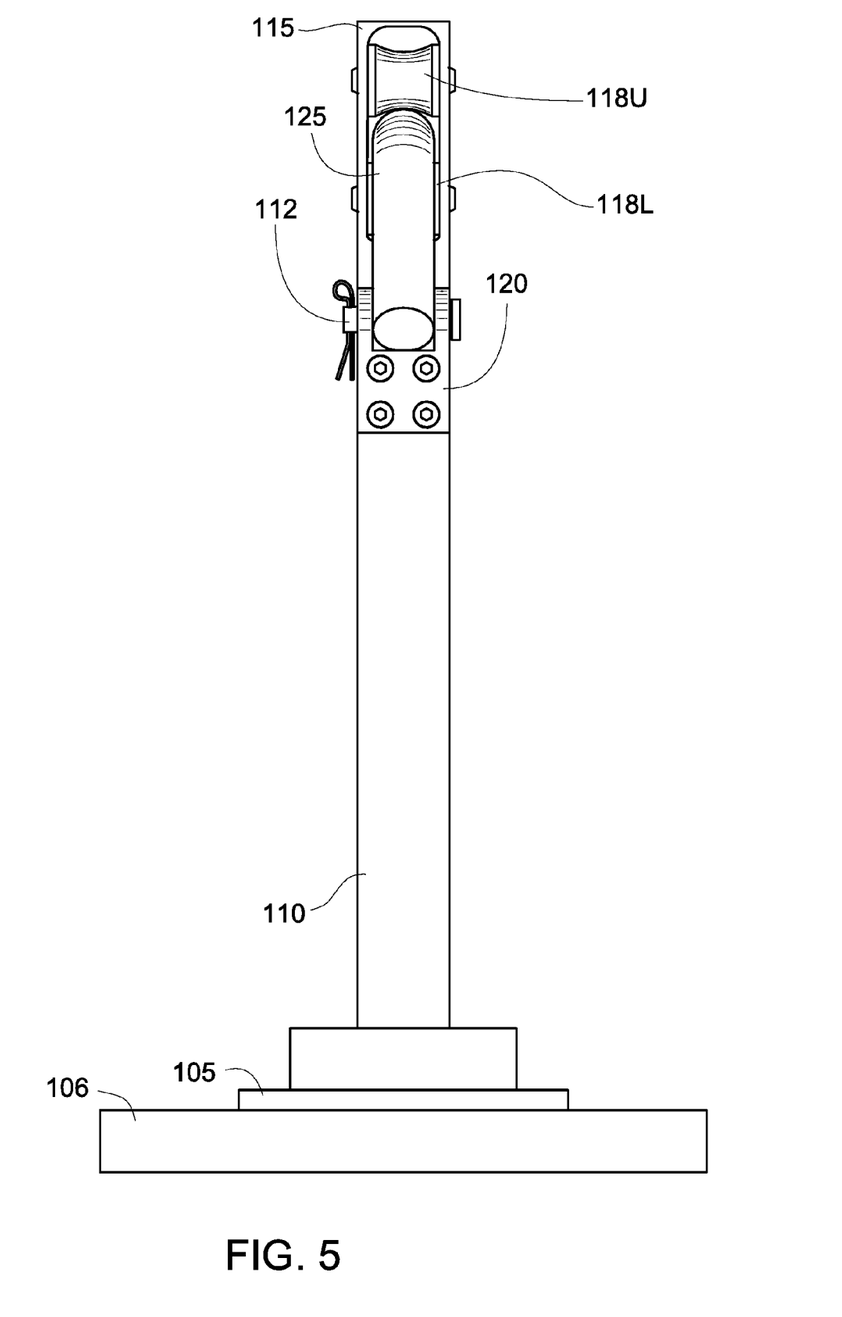
FIG. 5 is a back-side plan view of the exemplary embodiment of an oyster opening device depicted in FIG. 2.
Figure 6:
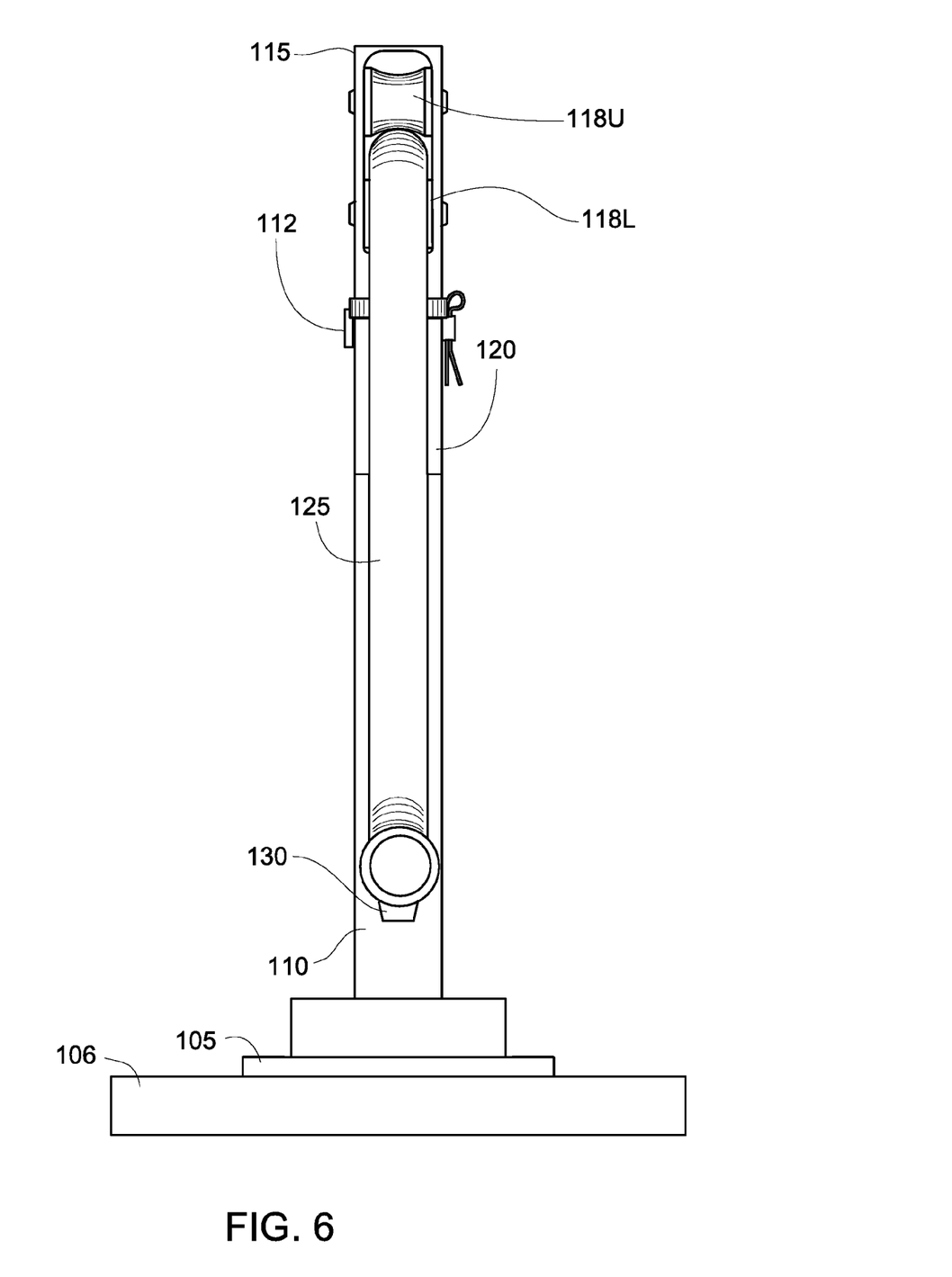
FIG. 6 is a front-side plan view of the exemplary embodiment of an oyster opening device depicted in FIG. 2.
Figure 7:
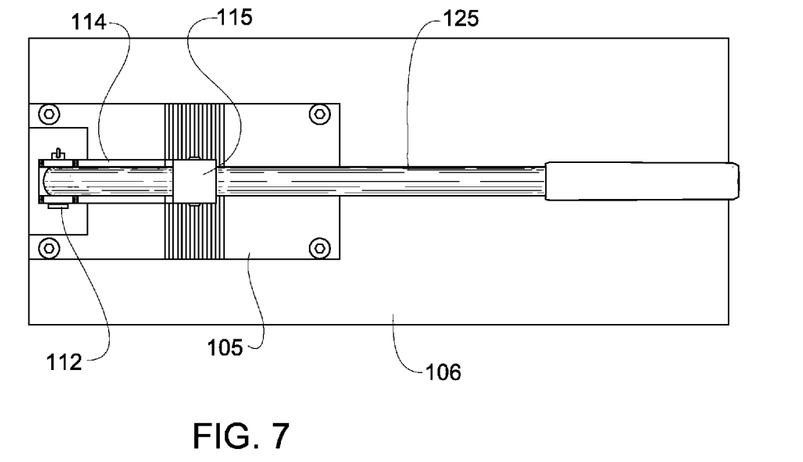
FIG. 7 is a top-side view of the exemplary embodiment of an oyster opening device depicted in FIG. 2.
Figure 8:
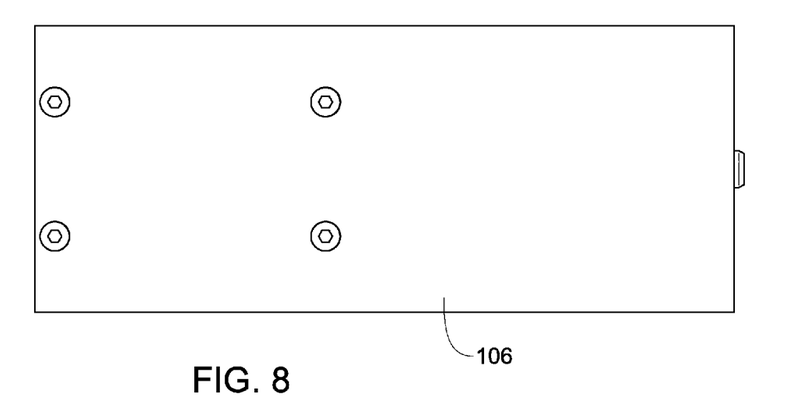
FIG. 8 is a bottom-side view of the exemplary embodiment of an oyster opening device depicted in FIG. 2.
Figure 9:
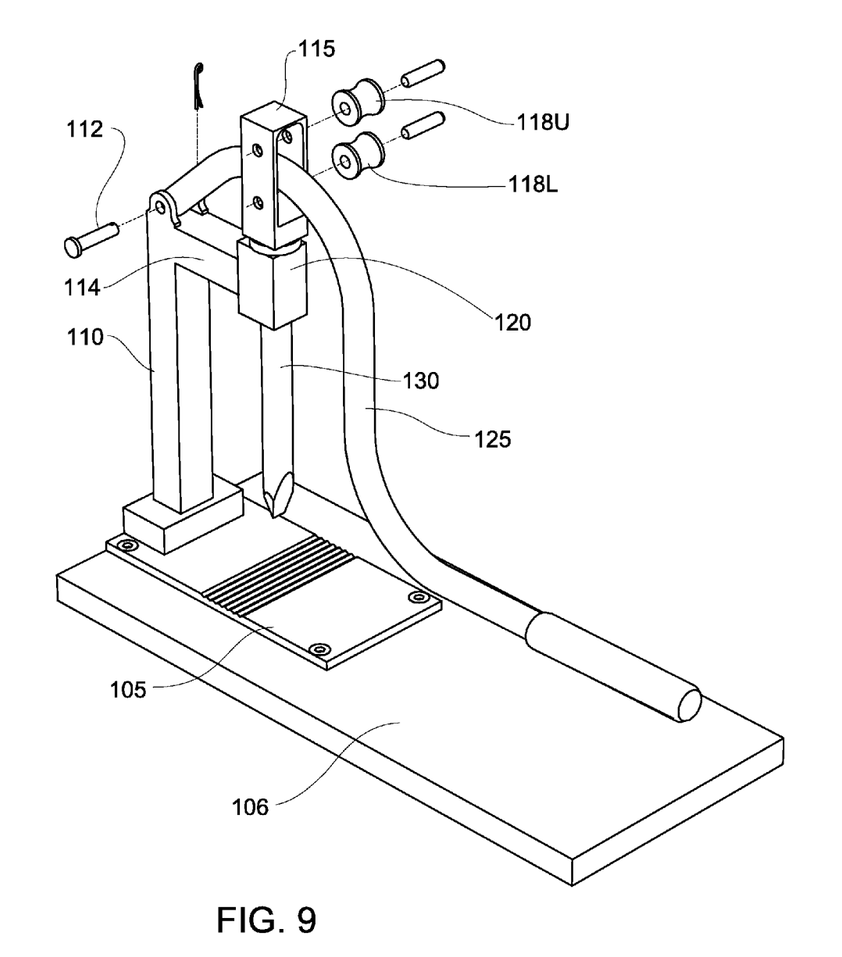
FIG. 9 is a partially exploded perspective view of the exemplary embodiment of an oyster opening device depicted in FIG. 2.

FIG. 1 is a perspective view of an oyster opening device according to an exemplary embodiment of the solution, shown in a retracted, pre-actuation "starting" position prior to applying an opening force to an oyster. FIG. 2 is a perspective view of the exemplary embodiment of an oyster opening device depicted in FIG. 1, shown in an extended, post-actuation position after having been used to apply an opening force to an oyster.

As can be seen in FIGS. 1-9, the oyster shucking device comprises a base 105 (which may be mounted to an anchor surface 106), a vertical back post 110, a lateral support arm 114 and a positioning cylinder 120. It is envisioned that the base 105 (in couple with the anchor surface 106) may be sized for portability of the oyster shucking device or, in some embodiments, may be configured for mounting to a work surface, such as a counter or bar. The positioning cylinder 120 may comprise a bushing or bearing (not shown) for guiding a spike 130 up and down through the positioning cylinder 120. It is envisioned that a bushing in the positioning cylinder 120 of some embodiments may be constructed of a polymeric material having a relatively high lubricity, such as Delrin® for example.

A curved handle 125 is anchored to the top of the vertical back post 110 via a hinge point 112 (such as a cotter pin) such that the curved handle 125 may be raised or lowered, as would be understood by one of ordinary skill in the art viewing the figures. The curved handle 125 extends from the hinge point 112 through a bearing box 115 that houses a pair of upper 118U and lower 118L parabolic roller bearings. The handle 125, which may have a round cross-section at least at its portion that engages the roller bearings 118, is "sandwiched" between the pair of roller bearings 118 in the bearing box 115 such that one roller bearing 118U is on top of the curved handle 125 and the other 118L is below the curved handle 125. It is envisioned that the roller bearings 118 may take the form of different three-dimensional shapes depending on the embodiment. The exemplary roller bearings 118 shown in the figures features a hyperbolic cross-sectional shape.

The spike 130 is fixed at its uppermost point to the base of the bearing box 115 such that the shaft of the spike 130 extends down through the positioning cylinder 120. As would be understood by one of ordinary skill in the art viewing the illustrations, the spike 130 may be raised or lowered, as the case may be, when an actuation force is applied to the curved handle 125.

To actuate an oyster opening device according to an embodiment of the solution, an upward actuation force may be applied to the handle 125 such that it pivots at hinge 112 and raises spike 130. Notably, as the curved handle 125 is raised, the upper bearing 188U in the bearing box 115 rides along a length of the curved handle 125. In doing so, the bearing box 115 is raised, thereby also vertically raising the spike 130. With the spike 130 vertically raised, an oyster may be positioned beneath the spike 130 and readied for opening.

Once the oyster is positioned in the oyster shucking device, a downward actuation force applied to the handle 125 may cause the spike 130 to lower and contact the oyster at its hinge or some other pry point selected by a user. A slight downward actuation force may have been applied to the curved handle 125 in order to bring the spike 130 down to, and in contact with, the oyster.

Upon application of a downward actuation force on the curved handle 125, the curved handle 125 translates the force through the lower bearing 118L in the bearing box 115, thereby magnifying the actuation force through the spike 130. The downward motion of the spike 130 works to breach the oyster and crack it. Advantageously, the curved shape of the curved handle 125 in conjunction with the bearings 118 of the bearing box 115, and the stable, vertical alignment provided by the positioning cylinder 120, work together to generate a significant, yet controllable downward force on the spike 130 without requiring a user to apply an excessive actuation force on the curved handle 125.

As depicted in FIG. 2, the oyster is shown in its pried open (i.e., "shucked" or "cracked") state after having been opened by the exemplary embodiment of an oyster shucking device according to the solution.

Various aspects, features and characteristics of an oyster opening device according to the solution have been described using detailed descriptions of embodiments thereof that are provided by way of example and are not intended to limit the scope of the disclosure. The described embodiments comprise different features, not all of which are required in all embodiments of an oyster opening device according to the solution. Some embodiments of an oyster opening device according to the solution utilize only some of the features or possible combinations of the features. Variations of embodiments of an oyster opening device according to the solution that are described and embodiments an oyster opening device according to the solution comprising different combinations of features noted in the described embodiments will occur to persons of the art.

It will be appreciated by persons skilled in the art that systems, devices and methods for the provision of an oyster opening device according to the solution is not limited by what has been particularly shown and described herein above.

What is claimed is:

1. An oyster opening device, the oyster opening device comprising:
a base;
a substantially vertical back post;
a curved handle;
a spike component having a pointed end;
a bearing box comprising a pair of roller bearings in contact with the curved handle; and
a positioning cylinder;
wherein:
the substantially vertical back post is anchored to the base;
the positioning cylinder extends over the base from an upper portion of the substantially vertical back post;
the curved handle is mechanically fixed to the substantially vertical back post via a hinge such that the handle is operable to raise and lower;
the bearing box is mechanically fixed to the spike at an upper end opposite the pointed end;
the spike extends through the positioning cylinder such that the spike is substantially perpendicular to the base and parallel to the back post; and
the curved handle extends through the bearing box such that when the curved handle is raised or lowered the spike is also raised or lowered.

2. The oyster opening device of claim 1, wherein the roller bearings comprise a hyperbolic cross-sectional shape.

3. The oyster opening device of claim 1, wherein the base is comprised of wood.

4. The oyster opening device of claim 1, wherein the base is comprised of plastic.

5. The oyster opening device of claim 1, wherein one or more components are constructed of aluminum.

6. The oyster opening device of claim 1, wherein one or more components are constructed of stainless steel.

7. The oyster opening device of claim 1, further comprising a bushing component within the positioning cylinder.

* * * * *